United States Patent [19]
Citta et al.

[11] Patent Number: 5,016,100
[45] Date of Patent: May 14, 1991

[54] TRANSMISSION OF A VIDEO SIGNAL USING ADAPTIVE DELTA MODULATION

[75] Inventors: Richard W. Citta, Oak Park; Dennis M. Mutzabaugh, Mt. Prospect, both of Ill.

[73] Assignee: Zenith Electronics Corporation, Glenview, Ill.

[21] Appl. No.: 453,525

[22] Filed: Dec. 20, 1989

Related U.S. Application Data

[63] Continuation-in-part of Ser. No. 176,839, Apr. 4, 1988, abandoned.

[51] Int. Cl.⁵ ............................................. H04N 7/12
[52] U.S. Cl. ..................................... 358/133; 358/141
[58] Field of Search ................... 358/133, 12, 141, 142

[56] References Cited

U.S. PATENT DOCUMENTS 3,628,148 12/1971 Brolin .
4,233,684 11/1980 Eggermont .
4,268,861 5/1981 Schreiber et al. .
4,467,356 8/1984 McCoy .............................. 358/12 X
4,573,167 2/1986 Hentschke et al. ............. 358/135 X
4,646,322 2/1987 Flanagin et al. .
4,665,436 5/1987 Osborne et al. ................ 358/133 X
4,745,473 5/1988 Hall ................................. 358/426 X
4,752,827 6/1988 Cassagne et al. ................ 358/13 X
4,782,387 11/1988 Sabri et al. ........................... 358/133
4,811,019 3/1989 Julstrom et al. .
4,821,097 4/1989 Robbins .
4,926,244 5/1990 Isnardi ................................. 358/12

Primary Examiner—Victor R. Kostak

[57] ABSTRACT

A method of transmitting a video signal includes separating one or more parts of the video signal into a high frequency component and a low frequency component, encoding the low frequency component using an adaptive delta modulation process and transmitting the encoded low frequency components during non-active intervals of the high frequency component. In one embodiment, the high frequency component is encoded using an entropy code. A receiver is provided for reconstructing a video signal in response to the received encoded signals.

23 Claims, 6 Drawing Sheets

TRANSMISSION OF A VIDEO SIGNAL USING ADAPTIVE DELTA MODULATION

CROSS REFERENCE TO RELATED APPLICATIONS

This application is related to co-pending U.S. application Ser. No. 238,956, filed Aug. 31, 1988, in the names of Richard Citta and Ron Lee, entitled "TV Signal Transmission Systems and Methods", of common ownership herewith and a continuation in part of application Ser. No. 176,839, filed Apr. 4, 1988, now abandoned. The disclosure of the '956 application is incorporated herein by reference.

FIELD OF THE INVENTION

The present invention is related to video systems. More specifically, this invention is related to the transmission of video signals wherein all or part of the signal is transmitted digitally.

BACKGROUND OF THE INVENTION

High Definition Television (HDTV) has become both a technical opportunity and a political problem. Current television technology in the United States is limited by a broadcast standard that is more than 30 years old. Technology has improved significantly and the opportunity is available for a new standard with far greater sound and picture quality. Improved picture quality generally requires more picture detail, more picture detail generally requires more transmitted information, and more transmitted information generally requires more bandwidth. Many HDTV systems have been proposed using channels with bandwidths of 12 to 30 Mhz.

NTSC, the current U.S. television broadcast standard, limits television signals to 6 Mhz channels. In order to allow larger bandwidth channels for HDTV, the Federal Communications Commission (FCC) would need to either allocate new bandwidth for HDTV or reallocate the current television spectrum. Many new services such as cellular telephone, pagers, and data networks are clamoring for more bandwidth. Allocating more bandwidth for television would necessarily mean less bandwidth for these other important services.

Reallocating the current spectrum would have an adverse impact on existing television receivers. The FCC has made it clear that it is not willing to accept either the allocations of new bandwidth for television transmission nor the reallocation of the television spectrum. Any new HDTV standard must, therefore, be compatible with the current allocation of 6 mhz television channels.

The MUSE system developed by NHK of Japan addresses the problem of available bandwidth by broadcasting HDTV signals direct from satellites at very high frequencies. This adds the cost of a satellite earth station to the already high price of a HDTV receiver and is, therefore, an economically unacceptable solution in the U.S.

Another limiting factor of current television broadcast spectrum is co-channel interference (interference between broadcasters using the same channel in neighboring cities). As an example, Chicago broadcasts on channels 2, 5, 7, 9, and 11 in the VHF band while Milwaukee broadcasts on channels 3, 6, 8, and 12 in the VHF band. These neighboring cities are not allowed to broadcast on co-channels.

Due to the large power needed to broadcast current NTSC signals, signals from Chicago broadcasts may carry well into the Milwaukee service area just as signals from Milwaukee may travel well into the Chicago service area. While these signals are normally not strong enough to provide an acceptable picture in the neighboring service area, they can present sufficient interference making it necessary to restrict the use of co-channels by the two neighboring service areas. A system that allows HDTV to broadcast on these previously "taboo" co-channels will be able to provide HDTV service without any hindrance to existing NTSC broadcasts or visa versa.

The '956 application discloses a method for transmitting a television signal comprising removing the low frequencies from the signal, digitizing the low frequency information and broadcasting that low frequency information in the vertical blanking interval of the video signal. Since, most of the power required to broadcast a television signal is used to broadcast the low frequencies, the transmission system disclosed in the '956 application requires far less power than a conventional system. As a result of the reduced broadcast power, a television signal can be broadcast on previously taboo channels without interfering into a co-channel of a neighboring service area.

The amount of low frequency information or low frequency bandwidth that can be removed is determined by the amount of digital information that can be inserted in the vertical blanking interval. More efficient data compression of the low frequency information will result in both less power required to transmit the signal and more bandwidth remaining to transmit more detail in the high frequency component.

OBJECTS OF THE INVENTION

It is a basic object of this invention to provide an improved method of transmitting a video signal.

It is another object of this invention to provide an improved method of transmitting a video signal within a reduced bandwidth.

It is a further object of this invention to provide an improved method of transmitting a video signal using reduced power.

It is a further object of this invention to provide an improved method of transmitting a video signal by broadcasting a low frequency component of the video signal in a compressed digital format.

It is a further object of this invention to provide an improved method of transmitting a video signal by broadcasting a low frequency component of the video signal in a digital format and applying adaptive delta modulation to that signal.

It is a further object of the invention to provided an all digital transmission system by applying adaptive delta modulation to a low frequency component and applying entropy coding to a high frequency component signal.

BRIEF DESCRIPTION OF THE DRAWINGS

Preferred embodiments demonstrating the various objectives and features of the invention will now be described in conjunction with the following drawings in which.

DETAILED DESCRIPTION OF THE PREFERRED EMBODIMENTS

Figure 1:
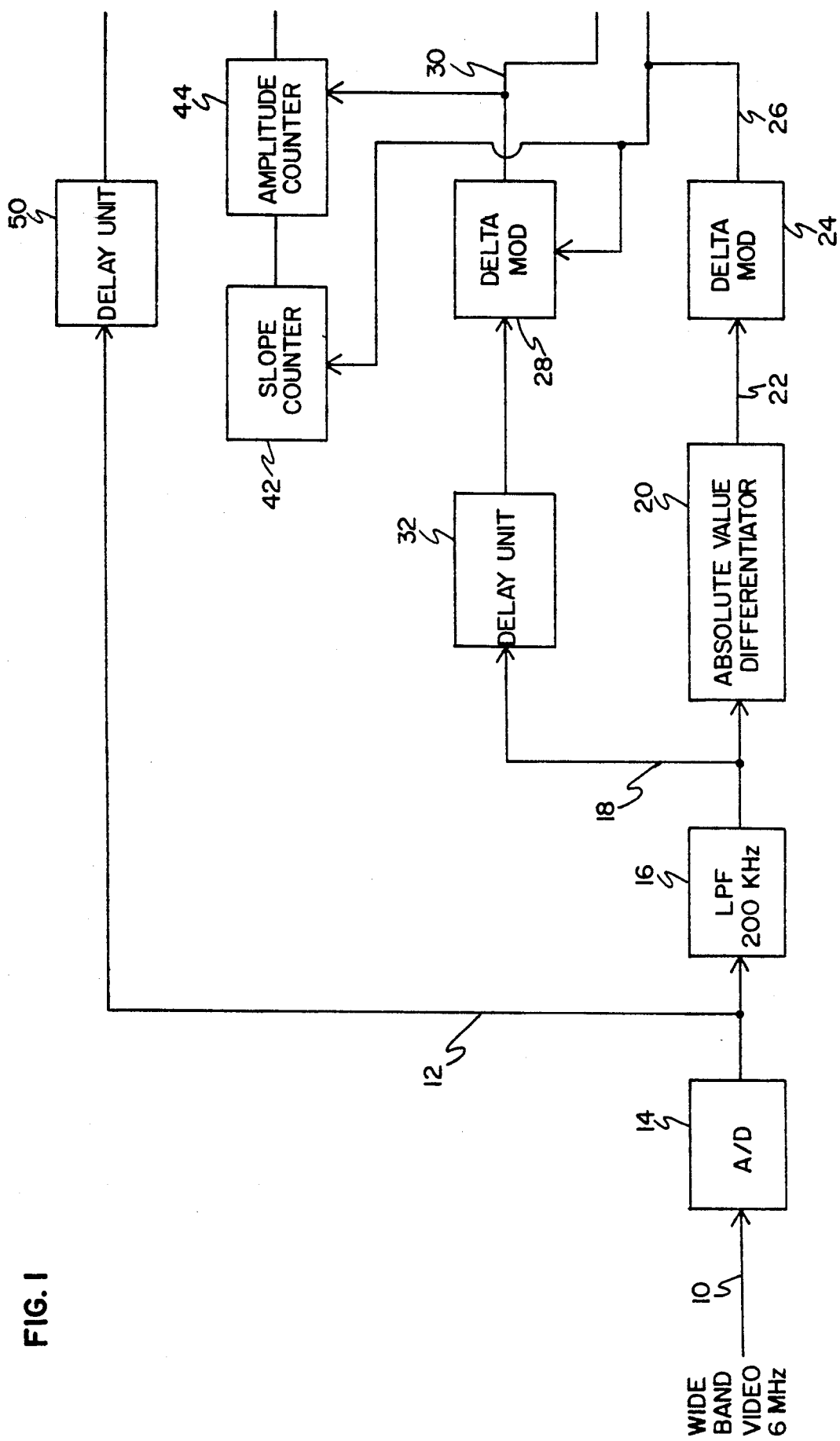
FIG. 1 is a block diagram of one embodiment of a transmitter according to the present invention.
Figure 1:
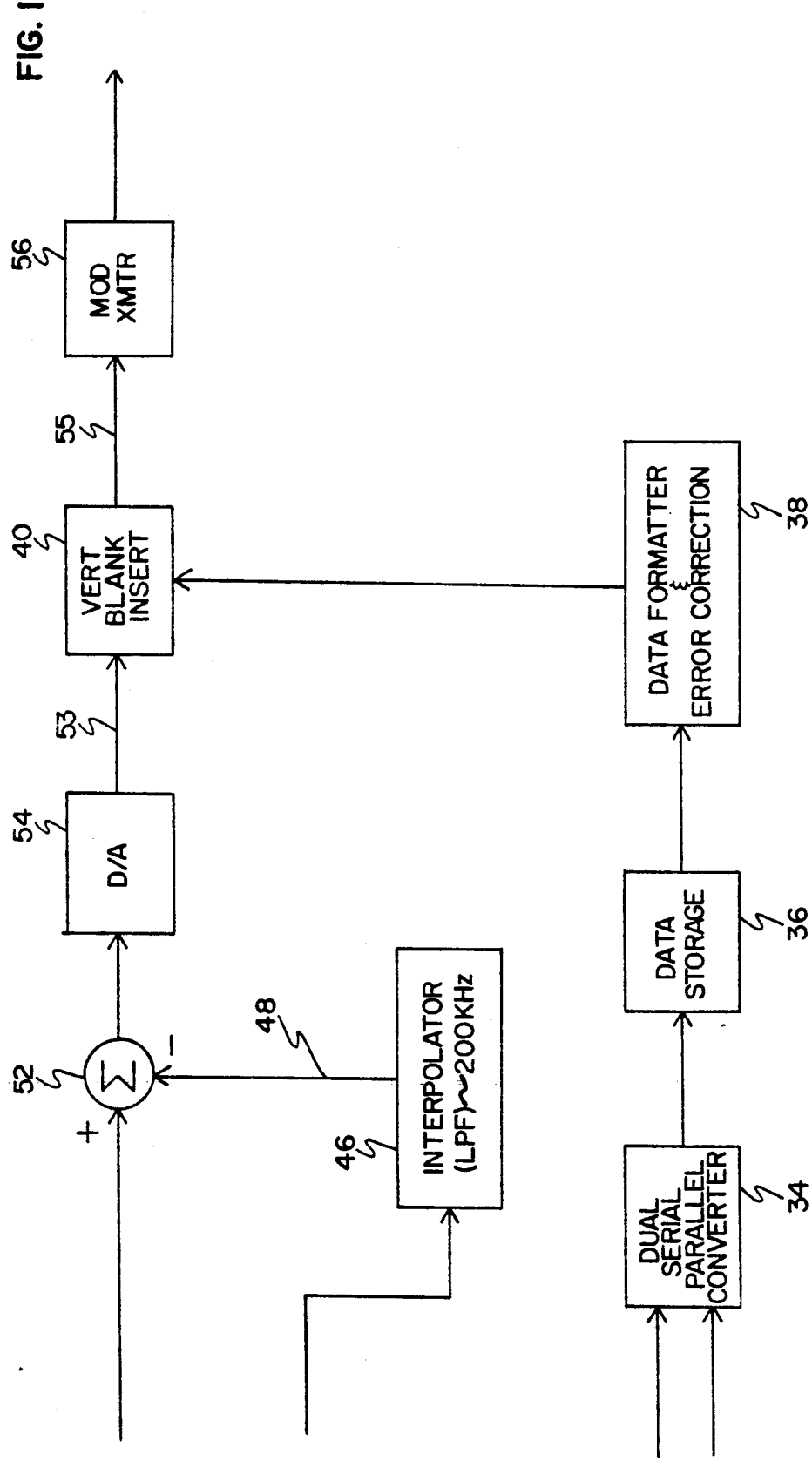

In one embodiment of the present invention, a television signal includes luminance, chrominance, and audio signals. The luminance signal is separated into a high frequency component and a low frequency component, the low frequency component corresponding to a relatively small fraction of the bandwidth of the luminance signal and the high frequency component corresponding to a relatively large fraction of the bandwidth of the luminance signal. The low frequency component is encoded into two digital signals; the first digital signal indicating an increase or decrease in the amplitude of the low frequency component and the second digital signal indicating an increase or decrease in the rate of change or step size of the amplitude of the low frequency component. This method of encoding is commonly known as adaptive delta modulation.

The digitally encoded low frequency component is inserted in the vertical blanking interval of the high frequency component for transmission. The greatest advantage is obtained by applying the present invention to the luminance signal. Additional advantage can be obtained by applying the invention to the chrominance signal either alone or in addition to the luminance signal but with a slightly smaller cost advantage.

Delta modulation generally comprises a method of encoding a signal in which a logical 1 represents an increase in the amplitude of the input signal and a logical 0 represents a decrease in the amplitude of the input signal. Counters are used at both the encoder and decoder to track the amplitude level. Each counter value represents an amplitude level of the encoded signal. The encoder samples the input signal, increments its counter value, and sends a 1 when the input signal amplitude is greater than the current counter value. The encoder decreases its counter value and sends a zero when the input signal amplitude is less than the current counter value. The decoder increments its counter in response to a received 1 and decreases its counter in response to a received 0. The decoder outputs a signal with an amplitude represented by the decoder's counter value. In delta modulation, the unit of change is fixed; only the direction of change is variable. With each digital bit the counters are either increased or decreased by one unit.

In adaptive delta modulation, a second bit stream represents changes in the units of change in amplitude (i.e. step size). A 1 usually represents an increase in the rate of change while a 0 usually represents a decrease in the rate of change. This is accomplished by applying normal delta modulation techniques to a signal which is the absolute value of the first derivative of the basic signal. Counters are again used at both the encoder and decoder. Adaptive delta modulation does not always employ a one-to-one correspondence between counter value and step size (i.e. a counter value of three does not necessarily correspond to a step size of three times the step used when the counter value is one.) A one-to-one correspondence generally will result in a signal that is too volatile. The preferred embodiment of the present invention uses the following step size pattern:

| Counter Value | Step Size |
| --- | --- |
| 0 | 1 |
| 1 | 1 |
| 2 | 2 |
| 3 | 4 |
| 4 | 4 |
| 5 | 4 |
| 6 | 4 |
| 7 | 4 |

Delta modulation or adaptive delta modulation can be applied directly to an analog signal or to a PCM digital signal. In the preferred embodiment an input analog signal is converted to a PCM digital signal before it is encoded by adaptive delta modulation. In this case, the previously referred to amplitude levels are digital values derived from an amplitude level.

Referring to FIG. 1, a wide band analog input luminance signal on input line 10 is first converted to a PCM digital signal on line 12 by an analog to digital converter 14. The sample rate (FS) of analog to digital converter 14 is preferably 5.6 MHz. An analysis filter 16, which may comprise a low pass phase linear FIR filter, passes only a low frequency component of the PCM digital signal from line 12 to line 18. The low frequency component signal is the portion of the PCM digital signal which is less than, for example, about 200 KHz. An absolute value differentiator 20 generates a slope signal on line 22 which is the absolute value of the first derivative of the low frequency component signal.

A delta modulator 24 generates a delta modulated slope signal on line 26 in response to the slope signal on line 22. An adaptive delta modulator 28 generates an adaptive delta modulated signal on line 30 in response to the low frequency component signal on line 18 and the delta modulated slope signal on line 26.

The low frequency component signal on line 18 is delayed in a delay unit 32. The delay in delay unit 32 is equivalent to the delay in both absolute value differentiator 20 and delta modulator 24 so that a given time sample of the low frequency component signal on line 18 arrives at adaptive delta modulator 28 simultaneously with the same time sample of the delta modulated slope signal on line 26.

A dual serial to parallel converter 34 receives the delta modulated slope signal from line 26 and the adaptive delta modulated signal from line 30, converts these signals into parallel data bytes and writes the data bytes to a data storage unit 36. Data storage unit 36 holds one field worth of low frequency information.

A data formatter 38 reads a field of data from data storage unit 36, adds error correction information and sends that data to vertical blank insertion unit 40. Vertical blank insertion unit 40 inserts the low frequency component signal in the vertical blanking interval of a high frequency component signal. A CRT "draws" an image on its screen with an electron beam one line of pixels at a time from left to right. It draws the lines from top to bottom. The vertical blanking interval is the time required to redirect the electron beam from the bottom of the screen back to the top of the screen. The horizontal blanking interval is the time required to redirect the electron beam from the right side of the screen back to the left side of the screen. Under the the NTSC system, no information is sent during either the horizontal or the vertical blanking intervals. The vertical blanking interval is longer than the horizontal blanking interval and is, therefore, more adaptable for the transmission of data. However, either interval can be used effectively to implement the invention.

Figure 2:
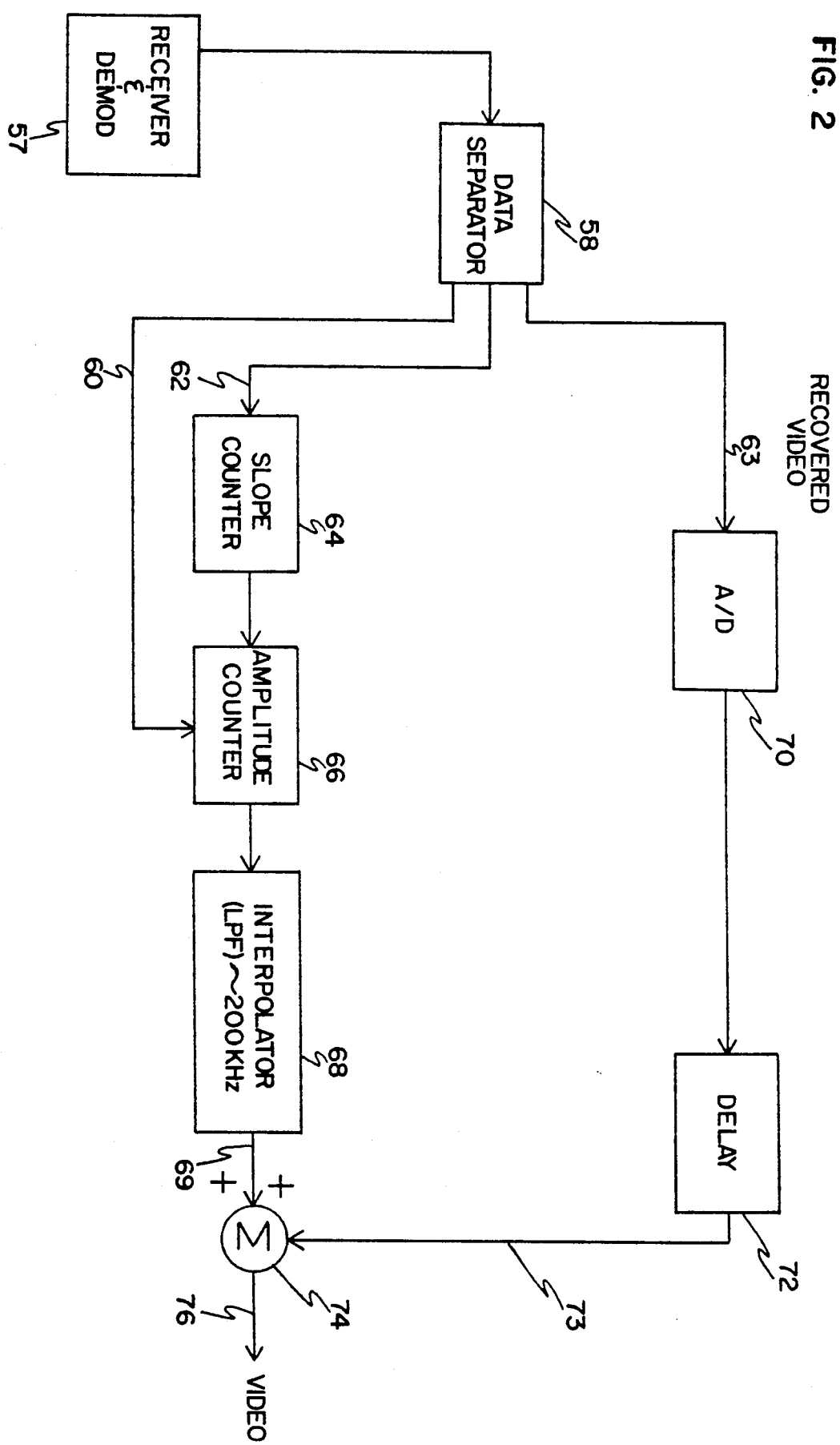
FIG. 2 is a block diagram of one embodiment of a receiver according to the present invention.

A slope counter 42, an amplitude counter 44, and an interpolator 46 are exact duplicates of corresponding units found in the the receiver (FIG. 2). By counting the delta modulated slope signal on line 26 and the adaptive delta modulated signal on line 30, the counters generate a stair step like signal approximating the low frequency component signal. The signal from the counters is smoothed out by interpolator filter 46 generating a reconstructed low frequency component signal on line 48. The reconstructed low frequency component signal more closely approximates the low frequency component signal on line 18 than the signal directly from the counters.

Slope counter 42 increments each time a one is received on line 26 from delta modulator 24 and decrements each time a zero is received on line 26 from delta modulator 24. The value of slope counter 42 as applied to amplitude counter 44 regulates the step size of the output signal from amplitude counter 44. Amplitude counter 44 generates its output signal by increasing or decreasing the amplitude of its output signal by the step size supplied by slope counter 42. Amplitude counter 44 increases the amplitude of its output signal each time it receives a one from adaptive delta modulator 28 and decreases the amplitude of it output signal each time it receives a zero from adaptive delta modulator 28 according to the same algorithm used by delta modulator 24 and described above.

There is an inherent delay in the processing done to the low frequency component signal. Delay unit 50 matches that delay so that both the PCM digital signal on line 12 and the reconstructed low frequency component signal on line 48 are in phase when they reach summation unit 52. Summation unit 52 subtracts the reconstructed low frequency component signal from line 48 from the PCM digital signal on line 12 resulting in high frequency difference signal on line 53.

By separating the reconstructed low frequency component signal rather than the original low frequency component signal, any error signal introduced by adaptive delta modulation is introduced equally at both the encoder and decoder. Because the decoder mirrors the encoder, any error signal produced by encoding is corrected by the inverse signal during decoding. A digital to analog converter 54 converts high frequency difference signal from line 53 back to an analog signal for broadcast. The digital low frequency signal is inserted in to the vertical blanking interval of the analog high frequency signal by inserter 40 and then the combined signal on line 56 is modulated and transmitted by modulator/transmitter 56 over, for example, a 6 MHz. channel.

Referring to FIG. 2, the receiver includes a demodulator/receiver 57 which receives the combined signal from the transmitter (corresponding to the signal developed on line 55) and sends it to a data separator 58. Data separator 58 separates an adaptive delta modulated signal, line 60 and a delta modulated slope signal on line 62 from the vertical blanking interval of the high frequency signal, line 63. Signals 60 and 62 are identical to signals 26 and 30 (FIG. 1) respectively. These signals are applied to identical circuits as in the transmitter.

Specifically, receiver slope counter 64 corresponds to transmitter slope counter 42 (FIG. 1); receiver amplitude counter 66 corresponds to transmitter amplitude counter 44 (FIG. 1); and receiver interpolator 68 corresponds to transmitter interpolator 46 (FIG. 1). The interconnection and operation of these devices is exactly the same as described above with respect to the transmitter. The identical circuitry in both the transmitter and receiver compensates for distortions introduced by adaptive delta modulation as explained above.

Slope counter 64 increments each time a one is received on line 62 from data separator 58 and decrements each time a zero is received on line 62 from data separator 58. The value of slope counter 64 as applied to amplitude counter 66 regulates the step size of the output signal from amplitude counter 66. Amplitude counter 66 generates its output signal by increasing or decreasing the amplitude of its output signal by the step size supplied by slope counter 64. Amplitude counter 66 increases the amplitude of its output signal each time it receives a one from data separator 58 and decreases the amplitude of it output signal each time it receives a zero from data separator 58 according to the same algorithm used by delta modulator 24 and described above.

By counting the delta modulated slope signal on line 62 and the adaptive delta modulated signal on line 60, the counters generate a stair step like signal approximating the low frequency component signal. The signal from the counters is smoothed out by interpolator filter 68 generating a reconstructed low frequency component signal on line 69.

High frequency component signal 63, an analog signal, is converted to a PCM digital signal by analog to digital converter 70. Delay unit 72 delays the high frequency component signal so that the high frequency component signal, line 73, and low frequency component signal, line 69, arrive at a summation unit 74 in phase. Summation unit 74 combines the low and high frequency component signals to form a resultant signal on line 76. The resultant signal on line 76 is substantially identical to the input signal applied to line 10 of the transmitter (FIG. 1).

Figure 3:
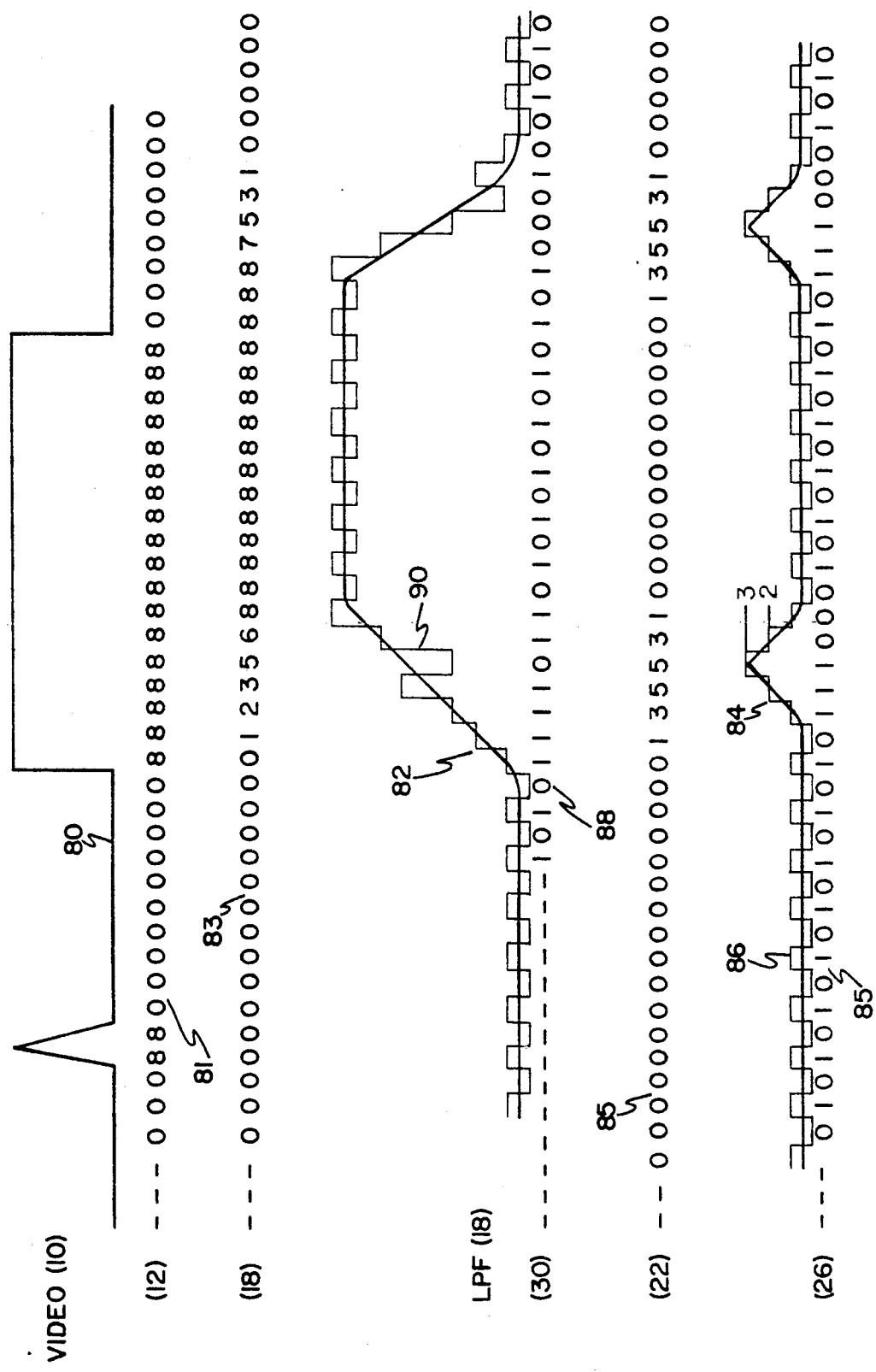
FIG. 3 is a series of wave forms demonstrating adaptive delta modulation as applied the low frequency portion of a typical video signal.

The operation of the transmitter and receiver described above will be more readily understood in connection with the exemplary waveforms of FIG. 3. Input signal trace 80 shows a portion of a typical video signal containing a spike and square wave which could be applied at input line 10 of the transmitter (FIG. 1). Data stream 81 represents the PCM output of analog-to-digital converter 14. After the input signal 81 is applied to analysis filter 16 the resultant low frequency component signal is shown as data stream 83 (corresponding to signal trace 82). The low frequency component signal is then applied to absolute value differentiator 20 and the resultant slope signal is shown as data stream 85 (corresponding to signal trace 84).

Note that in the preferred embodiment the low frequency component signal and slope signal are PCM digital data streams 83 and 85 respectively but are shown here as analog signals 82 and 84 for purposes of clarity. Delta modulator 24 generates data stream 85 from the digital slope signal shown as data stream 85. The amplitude values represented by data stream 85 are shown superimposed over slope signal trace 84 as signal trace 86. Data stream 85 is then applied to adaptive delta modulator 28 (FIG. 1) along with the low frequency component signal shown as signal trace 82 and data stream 83. Adaptive delta modulator 28 (FIG. 1) generates data stream 88 which in combination with data stream 85 represents an adaptive delta modulated signal shown as signal trace 90.

The distortion introduced by adaptive delta modulation represented by the difference between signal trace 82 and signal trace 90 comprises much higher frequencies than the low frequency component signal represented by signal trace 82. Interpolator filters 46 in the transmitter and 68 in the receiver eliminate most of that distortion by eliminating the high frequency component of the signal.

When the low frequency component signal shown by signal trace 82 is flat, output of delta modulator 24 (data stream 85) and adaptive delta modulator 28 (data stream 88) alternate between one and zero. As the low frequency component signal rises the output of adaptive delta modulator 28 (data stream 88) contains repeated ones. As the slope of the low frequency component signal increases the slope signal, shown by signal trace 84, rises, the output of delta modulator 24 (data stream 85) contains repeated ones. As the low frequency component signal falls the output of adaptive delta modulator 28 (data stream 88) contains repeated zeros. As the slope of the low frequency component signal decreases the slope signal, shown by signal trace 84, falls, the output of delta modulator 24 (data stream 85) contains repeated zeros.

Figure 4:
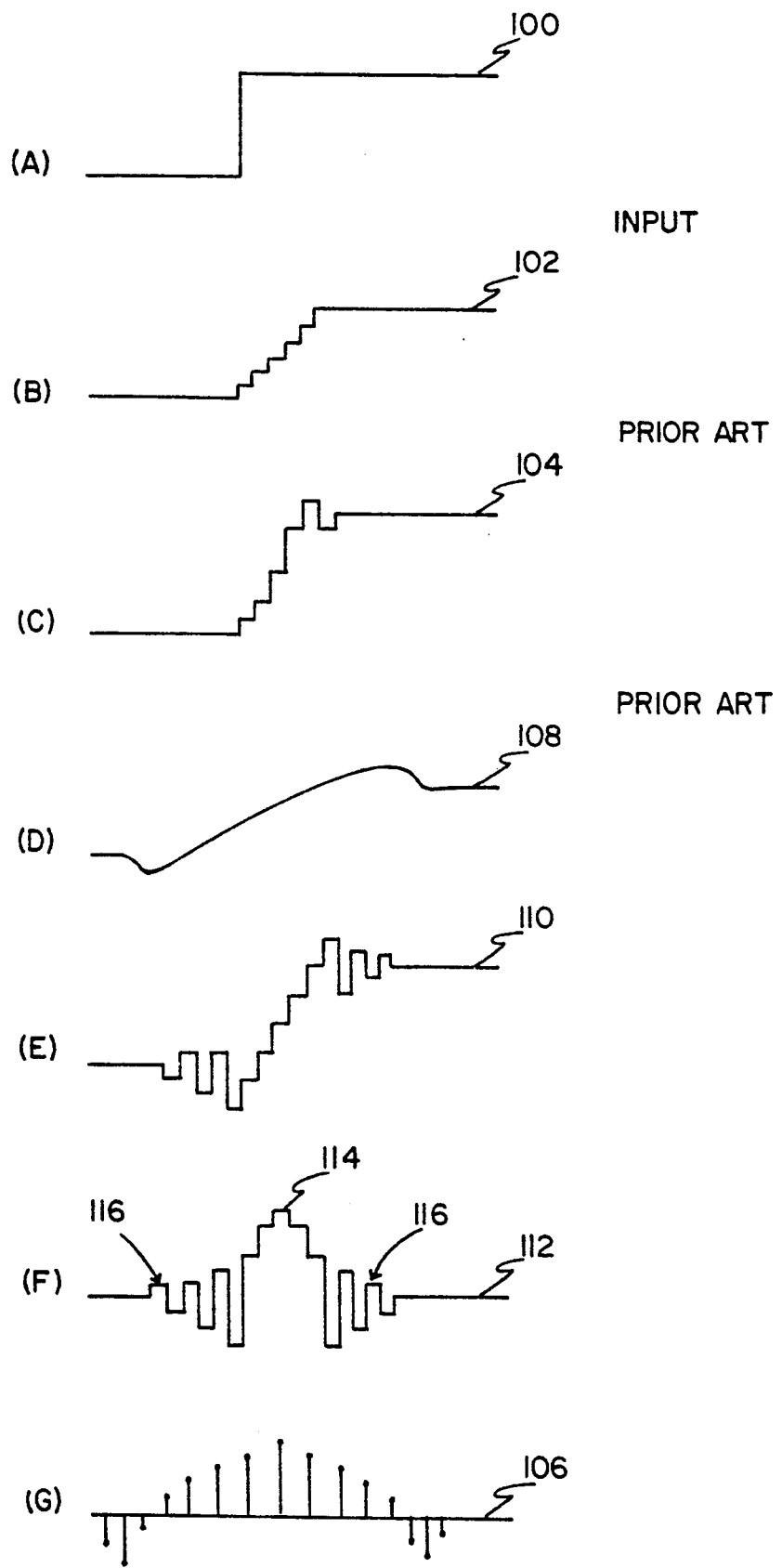
FIG. 4 contains several sample signals traces demonstrating some of the advantages of the invention.

FIG. 4 demonstrates the results of applying the previously discussed modulation techniques to a square signal edge which would cause a sharp line on a television screen. Input signal trace 100 represents a square input signal edge. Signal 100 is typical of a sharp edge in a television picture. Direct PCM encoding of this signal would require enough bits per sample to accurately describe the amplitude both before and after the transition. Signal trace 102 shows the result of applying delta modulation to input signal 100. Delta modulation only requires one bit per sample but does not accurately follow the slope of the input signal. Signal trace 104 shows the result if adaptive delta modulation is applied to input signal 100. Adaptive delta modulation requires two bits per sample and more accurately follows the original curve.

Response curve 106 demonstrates the output response for analysis filter 16 (FIG. 1). Signal trace 108 shows the output of analysis filter 16 in response to input signal 100. If Signal trace 100 was applied at input signal 10 (FIG. 1), then signal trace 108 would be equivalent to low frequency component signal, line 18 (FIG. 1). The Signal trace 110 demonstrates the output of adaptive delta modulation applied to signal 108. Signal 110 would form the input to interpolator filters 46 (FIG. 1) or 68 (FIG. 2). Signal 112 represents the resultant PCM high frequency component signal after the adaptive delta modulated low frequency component signal has been removed. Signal 112 is equivalent to the signal applied to digital to analog converter 54 (FIG. 1).

The form of the high frequency component signal is uniquely suited to data compression using entropy e.g. (Huffman) coding. According to this all digital embodiment of the invention, once the low frequency component has been removed the resultant high frequency component signal is relatively flat with occasional spikes where distinct edges appear in the video image. The spikes take the form of portion 114 of wave form 112 in FIG. 4. The greater the amplitude of a spike the less likely it is to occur. The vast majority of the time the high frequency component signal is flat as shown at 116.

Where, such as the case of waveform 112, there is a large variance in the probability of different amplitude levels of a signal occurring, entropy coding is most effective. Entropy coding assigns shorter codes (fewer bits) to likely signals and longer codes (more bits) to unlikely signals. Morse Code is a common example of entropy coding were a short code (.) is assigned to the most common letter in the alphabet, E and a long code (_ _ . _) is assigned to least common letter in the alphabet, Q.

The mean number of bits per discrete level required to send a digitized waveform using entropy coding is the sum for each discrete level of the probability of that level occurring times the log base 2 of that probability.

$$b_i = - \sum_{i=1}^{n} P_i \log_2 P_i$$

where $b_i$ is the mean number of bits per discrete level required for i discreet levels and $P_i$ is the probability of level i occurring. In this case, entropy coding reduces the total number of bits used to send a given signal. Short codes are assigned amplitude levels near zero and longer codes are assigned to larger positive or negative levels.

Figure 5:
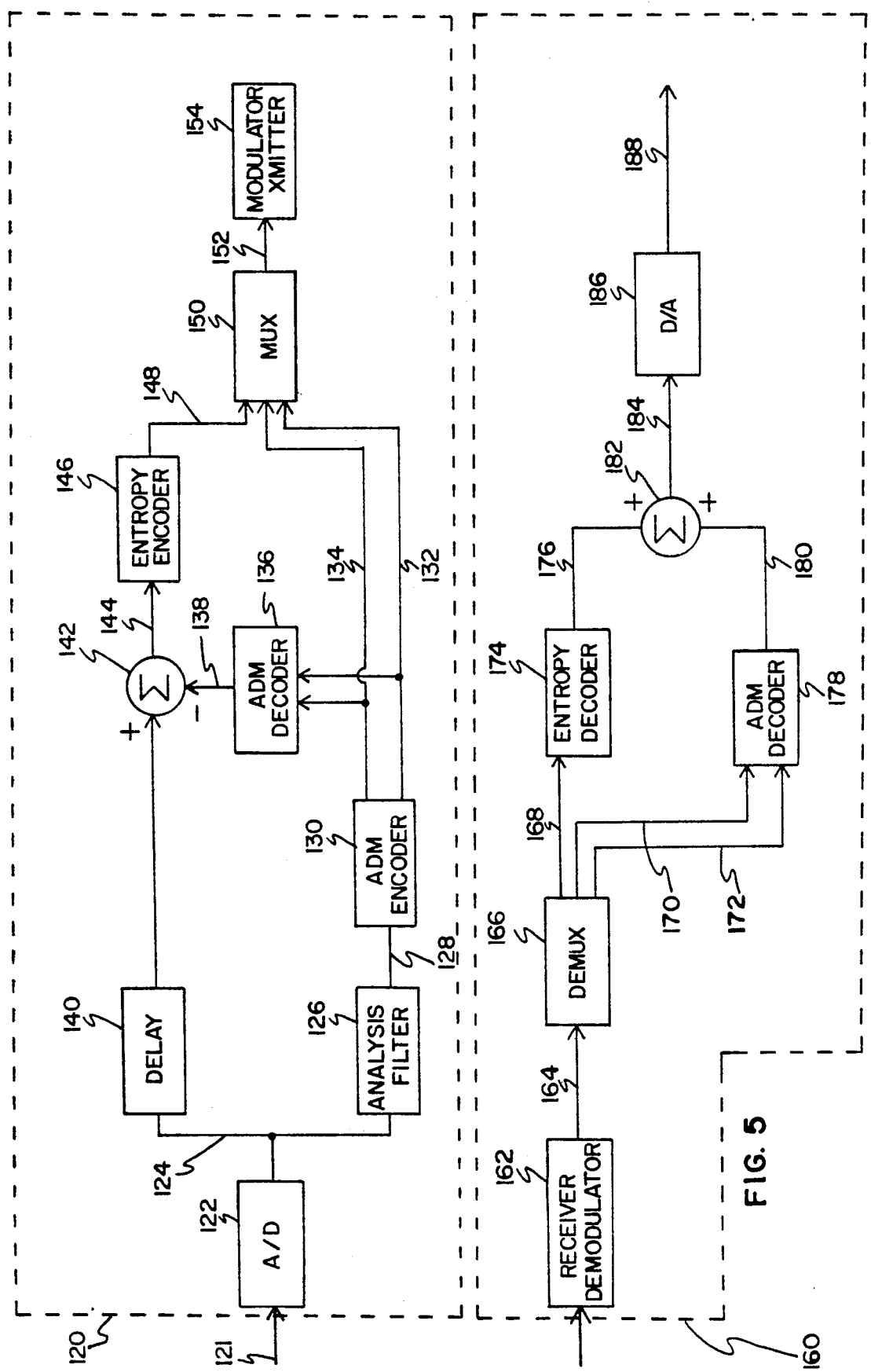
FIG. 5 is a block diagram of one all digital embodiment of the invention.

The application of entropy coding to the present invention is best understood with respect to the block diagram of FIG. 5, in which a transmitter 120 includes an analog to digital converter 122. Converter 122 generates a PCM digital signal on a line 124 in response to an input video signal on a line 121. The PCM signal is applied to an analysis filter 126 which generates a low frequency component signal on a line 128. The low frequency component signal is applied to an adaptive delta modulation (ADM) encoder 130 which generates a delta modulated slope signal on line 132 and an adaptive delta modulated signal on line 134. The outputs of ADM encoder 130 are applied to an ADM decoder 136 which generates a reconstructed low frequency component signal on a line 138. The PCM signal on line 124 is delayed in a delay unit 140 so that the PCM signal and the reconstructed low frequency component signal on line 138 both arrive at a summation unit 142 in phase.

Summation unit 142 subtracts the reconstructed low frequency component signal on line 138 from the PCM signal on line 124, providing a high frequency component signal on an output line 144. The high frequency component signal is applied to an entropy encoder 146 generating an entropy encoded signal on a line 148. The entropy encoded signal on line 148, the delta modulated slope signal on line 132, and the adaptive delta modulated signal on line 134 are time division multiplexed in a MUX 150. The Combined signal on line 152 is modulated and transmitted by a modulator/transmitter 154.

The receiver 120 includes a receiver/demodulator 162 which receives the combined signal and provides it in demodulated form on a output line 164. The demodulated signal on line 164 is equivalent to the combined signal on line 152 in the transmitter. A DEMUX 166 divides the combined signal in to an entropy encoded signal on a line 168, a delta modulated slope signal on a line 170, and an adaptive delta modulated signal on a line 172. The entropy encoded signal on line 168 is applied to an entropy decoder 174. Entropy decoder 174 generates a high frequency component signal on line 176 corresponding to the high frequency component signal developed on line 144 of the transmitter.

The delta modulated slope signal on line 170, and the adaptive delta modulated signal on line 172 are applied to an ADM decoder 178 which generates a reconstructed low frequency component signal on a line 180 corresponding to the output of ADM decoder 136 of the transmitter. The reconstructed low frequency component signal on line 180 and the high frequency component signal on line 176 are combined in a summation unit 182 which generates a corresponding PCM signal on a line 184. The PCM signal on line 184 is applied to a digital to analog converter 186 which generates an output signal on a line 188 that is substantially identical to the input video signal on line 121.

The transmitter of FIG. 5 is a variation of the transmitter of FIG. 1 and the receiver of FIG. 5 is a variation of the receiver of FIG. 2. Most of the correspondences are clear from the drawings (i.e. analog to digital converter 122 corresponds to analog to digital converter 14). However, the drawings of FIG. 5 have been simplified to avoid redundancy. Particularly, ADM encoder 130 of FIG. 5 corresponds to absolute value differentiator 20, slope delta modulator 24, adaptive delta modulator 28, and delay unit 32 of FIG. 1; ADM decoder 136 of FIG. 5 corresponds to slope counter 42, amplitude counter 44, and interpolator 46 of FIG. 1; and ADM decoder 178 of FIG. 5 Corresponds to slope counter 64, amplitude counter 66, and interpolator 68 of FIG. 2.

Although described above in terms of a few alternative embodiments, the present invention is set forth with particularity in the appended claims. Such modifications and alterations as would be apparent to one of ordinary skill in the art and familiar with the teachings of this application shall be deemed to fall within the spirit and scope of the invention.

We claim:

1. A method of processing and transmitting a video signal comprising:
   separating the video signal into a low frequency component and a high frequency component;
   encoding the low frequency component using a predetermined data compression method for developing a digital bit stream representing the low frequency component; and
   transmitting both the high frequency component signal and the digital bit stream, the digital bit stream being transmitted during the vertical blanking interval of the high frequency component.

2. The method according to claim 1 including digitally encoding the high frequency component using an entropy code.

3. A method of processing and transmitting a video signal comprising:
   separating a low frequency component from the video signal;
   encoding the low frequency component using a predetermined data compression method for developing a first digital bit stream representing the low frequency component;
   subtracting the low frequency component from the video signal to derive a high frequency component; and
   transmitting both the high frequency component and the first digital bit stream, the digital bit stream being transmitted during the vertical blanking interval of the high frequency component.

4. The method according to claim 3 including:
   entropy coding the high frequency component to develop a second digital bit stream; and transmitting the first and second digital bit streams.

5. A method of processing and transmitting a video signal comprising:
   converting the video signal into a digital video signal;
   separating a low frequency component from the digital video signal;
   encoding the low frequency component for developing first and second digital bit streams respectively representing changes in the direction and in the rate of change of the low frequency component;
   recovering a modified low frequency component from the first and second digital bit streams;
   subtracting the modified low frequency component from the digital video signal for providing a high frequency component; and
   transmitting the first and second digital bit streams in non-active intervals of the high frequency component.

6. The method according to claim 5 including converting the high frequency component to an analog signal before it is transmitted.

7. The method according to claim 5 including entropy coding the high frequency component for developing a third digital bit stream and transmitting the third bit stream.

8. The method according to claim 5 wherein said recovering step comprises:
   incrementing a slope count in response to the second bit stream representing an increase in the rate of change of the low frequency component;
   decrementing the slope count in response to the second bit stream representing a decrease in the rate of change of the low frequency component;
   increasing an amplitude count by a step size determined by the value of the slope count in response to the first bit stream representing an increase in the amplitude of the low frequency component;
   decreasing the amplitude count by a step size determined by the value of the slope count in response to the first bit stream representing a decrease in the amplitude of the low frequency component; and
   interpolating the amplitude count to provide the modified low frequency component.

9. A method of receiving and processing a video signal comprising:
   receiving a video signal including a high frequency component and a low frequency component, the low frequency component comprising first and second digital bit streams respectively representing changes in the direction and in the rate of change of the low frequency component and occurring during non-active intervals of the high frequency component;
   separating the first and second digital bit streams from the high frequency component;
   decoding the first and second digital bit streams to generate a modified low frequency component; and
   combining the high frequency component with the modified low frequency component to generate a recovered video signal.

10. The method according to claim 9 wherein the received high frequency component is digitally encoded using an entropy code and including the step of decoding the received high frequency component with a complimentary entropy decoder.

11. A method of receiving and processing a video signal comprising:
    receiving a video signal including a high frequency component and a low frequency component, the low frequency component comprising first and second digital bit streams respectively representing changes in the direction and in the rate of change of the low frequency component and occurring during non-active intervals of the high frequency component, the high frequency component comprising a third digital bit stream encoded in a compressed form;
    decoding the first and second digital bit streams for generating a recovered low frequency component;
    decoding the third digital bit stream for generating a recovered high frequency component; and
    combining the recovered high frequency component with the recovered low frequency component for generating a recovered video signal.

12. A video processor comprising means for separating a low frequency component from a video signal;
    means for generating a first signal representing the absolute value of the differential of the low frequency component;
    first encoding means for generating a first digital bit stream representing changes in the direction of the magnitude of the first signal;
    second encoding means for generating a second digital bit stream representing changes in the rate of change of the magnitude of the low frequency component;
    means for subtracting the first and second digital bit streams from the video signal to generate a high frequency component;
    means for combining the first and second bit streams with the high frequency component, including means for inserting the first and second digital bit streams in the vertical blanking interval of the high frequency component; and
    means for transmitting the combined signal.

13. The video processor of claim 12 further including analog-to-digital conversion means for supplying a digital video signal to the separating means.

14. The video processor of claim 12 further including means for encoding the high frequency component using an entropy code.

15. A video processor comprising:
    separating means for separating a low frequency component from a video signal;
    means for generating a first signal representing the absolute value of the differential of the low frequency component;
    first encoding means for generating a first digital bit stream representing changes in the direction of the magnitude of the first signal;
    second encoding means for generating a second digital bit stream representing changes in the rate of change of the magnitude of the low frequency component;
    means for generating a reconstructed low frequency component in response to the first and second digital bit streams; and
    means for subtracting the reconstructed low frequency component from the video signal to generate a high frequency component signal.

16. The video processor of claim 15 further comprising analog-to-digital conversion means for supplying a digital video signal to the separating means.

17. The video processor of claim 15 further including means for combining the first and second bit streams with the high frequency component and means for transmitting the combined signal.

18. The video processor of claim 17 wherein the means for combining includes means for inserting the first and second digital bit streams in the vertical blanking interval of the high frequency component.

19. The video processor of claim 15 further including means for encoding the high frequency component using an entropy code.

20. A video processor comprising means for providing a digital video signal;
    means for separating a low frequency component from the digital video signal;
    means for generating a first signal representing the absolute value of the differential of the low frequency component;
    first encoding means for generating a first digital bit stream representing changes in the direction of the magnitude of the first signal;
    second encoding means for generating a second digital bit stream representing changes in the rate of change of the magnitude of the low frequency component;
    means for generating a reconstructed low frequency component in response to the first and second digital bit streams;
    means for subtracting the reconstructed low frequency component signal from the digital video signal to generate a high frequency component;
    means for generating a third digital bit stream by encoding the high frequency component using an entropy code; and
    means for combining the first, second and third digital bit streams in a time division multiplex format.

21. Apparatus for receiving and processing a video signal comprising:
    means for receiving a video signal including a high frequency component and a low frequency component, the low frequency component comprising first and second digital bit streams respectively representing changes in the direction and in the rate of change of the low frequency component;
    means for separating the first and second digital bit streams from the high frequency component;
    means for decoding the first and second digital bit streams for generating a reconstructed low frequency component; and
    means for combining the high frequency component and the reconstructed low frequency component for generating a recovered video signal.

22. Apparatus according to claim 21 wherein the received high frequency component comprises an entropy coded third digital bit stream and including means for decoding said third bit stream for generating a reconstructed high frequency component, said combining means combining said reconstructed low and high frequency components for generating said recovered video signal.

23. A method of processing and transmitting a video signal comprising:
    separating a low frequency component from the video signal;

encoding the low frequency component using a predetermined data compression method for developing a digital bit stream representing the low frequency component;

subtracting the low frequency component from the video signal to derive a high frequency component; and transmitting both the high frequency component and the digital bit stream, the digital bit stream being transmitted during the horizontal blanking interval of the high frequency component.

* * * * *